United States Patent
Khalil et al.

(10) Patent No.: US 8,944,505 B2
(45) Date of Patent: Feb. 3, 2015

(54) SWIVELING PASSENGER SEAT

(75) Inventors: Franghie Rubio Khalil, Chihuahua (MX); Raul Daniel Flores Aguirre, Chihuahua (MX); Sahira Villalobos Gonzalez, Chihuahua (MX); Carla Cristina Gonzalez Salitrero, Chihuahua (MX); Jose Angel Vilchis Dominguez, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 298 days.

(21) Appl. No.: 13/293,704

(22) Filed: Nov. 10, 2011
(Under 37 CFR 1.47)

(65) Prior Publication Data

US 2012/0261954 A1  Oct. 18, 2012

Related U.S. Application Data

(60) Provisional application No. 61/456,679, filed on Nov. 10, 2010, provisional application No. 61/456,675, filed on Nov. 10, 2010, provisional application No. 61/456,673, filed on Nov. 10, 2010.

(51) Int. Cl.
*B60N 2/10* (2006.01)
*B60N 3/10* (2006.01)
(Continued)

(52) U.S. Cl.
CPC *B64D 11/06* (2013.01); *B60N 2/22* (2013.01); *B60N 2/242* (2013.01); *B60N 2/68* (2013.01);
(Continued)

(58) Field of Classification Search
CPC ............. B60N 2/10; B60N 3/10; B64D 11/06
USPC ................... 297/216.19, 331, 335; 244/118.6
See application file for complete search history.

(56) References Cited

U.S. PATENT DOCUMENTS

| 642,404 A | 1/1900 | Wilkerson |
|---|---|---|
| 1,744,364 A | 1/1930 | Cruickshank |

(Continued)

FOREIGN PATENT DOCUMENTS

| EM | 0020372910001 | 7/2012 |
|---|---|---|
| EM | 0020372910002 | 7/2012 |

(Continued)

OTHER PUBLICATIONS

Partial International Search Report dated May 9, 2012 in Application No. PCT/US2011/06016.

(Continued)

*Primary Examiner* — Anthony D Barfield
(74) *Attorney, Agent, or Firm* — Kilpatrick Townsend & Stockton LLP; Dean W. Russell, Esq.; Tiffany L. Williams, Esq.

(57) ABSTRACT

Described are passenger seat assemblies having a seat back support, a seat pan coupled to the seat back support, a seat support structure coupled to the seat pan, wherein the seat support structure comprises a mounting channel, and a mounting bar inserted through the mounting channel and coupled to the seat support structure. The mounting bar is configured to pivotally couple to a passenger cabin. The mounting bar may also be configured to rotate the passenger seat assembly between an upright position and a reclined position.

11 Claims, 20 Drawing Sheets

(51) Int. Cl.
   *B64D 11/06* (2006.01)
   *B60N 2/22* (2006.01)
   *B60N 2/24* (2006.01)
   *B60N 2/68* (2006.01)
   *B64D 11/00* (2006.01)

(52) U.S. Cl.
   CPC ............ *B60N 3/101* (2013.01); *B64D 11/0007* (2013.01); *B64D 2011/0606* (2013.01); *B64D 2011/062* (2013.01); *B64D 2011/0668* (2013.01); *B64D 2011/0672* (2013.01)
   USPC ........................ 297/331; 297/335; 244/118.6

(56) References Cited

U.S. PATENT DOCUMENTS

| | | | |
|---|---|---|---|
| 2,351,698 | A | 6/1944 | Nystrom |
| 2,642,927 | A | 6/1953 | Rising |
| 3,112,955 | A * | 12/1963 | Stolz .................... 297/216.19 X |
| 3,471,198 | A | 10/1969 | Homier et al. |
| 5,370,446 | A | 12/1994 | Bancod |
| 5,791,735 | A | 8/1998 | Helman |
| 5,829,836 | A | 11/1998 | Schumacher et al. |
| 5,876,085 | A | 3/1999 | Hill |
| 5,997,091 | A | 12/1999 | Rech et al. |
| 6,120,099 | A | 9/2000 | Reikeras et al. |
| 6,220,668 | B1 | 4/2001 | Scheffzuck |
| 6,250,716 | B1 | 6/2001 | Clough |
| 6,467,846 | B2 | 10/2002 | Clough |
| 6,533,359 | B1 | 3/2003 | Holstensson |
| 6,641,214 | B2 * | 11/2003 | Veneruso ...................... 297/325 |
| 6,666,517 | B2 | 12/2003 | Clough |
| 6,669,141 | B2 | 12/2003 | Schmidt-Schaeffer |
| 6,776,457 | B2 | 8/2004 | Muin et al. |
| D508,337 | S | 8/2005 | Stalmate et al. |
| 7,040,705 | B2 | 5/2006 | Clough |
| 7,080,886 | B2 | 7/2006 | Bauer |
| 7,131,698 | B2 | 11/2006 | Dowty et al. |
| 7,134,729 | B2 | 11/2006 | Dowty et al. |
| 7,144,083 | B2 | 12/2006 | List et al. |
| 7,201,448 | B2 | 4/2007 | Williamson et al. |
| 7,237,842 | B2 | 7/2007 | Schmuda von Trzebiatowski et al. |
| 7,264,313 | B2 | 9/2007 | Clough |
| 7,364,239 | B2 | 4/2008 | Clough |
| 7,500,721 | B2 | 3/2009 | Beroth et al. |
| 7,744,158 | B2 | 6/2010 | Schurg |
| 7,871,039 | B2 | 1/2011 | Fullerton et al. |
| 7,871,129 | B2 | 1/2011 | Boes et al. |
| 7,992,939 | B2 | 8/2011 | Pozzi |
| D651,001 | S | 12/2011 | Fleming |
| D659,900 | S | 5/2012 | Yu |
| 8,196,864 | B2 | 6/2012 | Ruiter et al. |
| 8,272,694 | B2 * | 9/2012 | Hawkins et al. ............... 297/341 |
| 2003/0178880 | A1 | 9/2003 | Hannah |
| 2004/0007910 | A1 | 1/2004 | Skelly |
| 2005/0269451 | A1 | 12/2005 | Schumacher et al. |
| 2010/0141008 | A1 | 6/2010 | Augade et al. |
| 2011/0168841 | A1 | 7/2011 | Achilles |
| 2012/0138744 | A1 | 6/2012 | Fullerton et al. |
| 2012/0261954 | A1 | 10/2012 | Khalil et al. |

FOREIGN PATENT DOCUMENTS

| | | |
|---|---|---|
| EM | 0020372910003 | 7/2012 |
| EM | 0020372910004 | 7/2012 |
| EP | 0192006 A1 | 8/1986 |
| EP | 0980826 A2 | 2/2000 |
| GB | 2438090 A | 11/2007 |
| WO | 2012064922 | 5/2012 |

OTHER PUBLICATIONS

International Preliminary Report on Patentability dated May 23, 2013 in Application No. PCT/US2011/060106.
International Search Report and Written Opinion dated Sep. 5, 2012 in Application No. PCT/US2011/06016.
U.S. Appl. No. 29/406,199, filed Nov. 10, 2011.
U.S. Appl. No. 29/406,201, filed Nov. 10, 2011.
U.S. Appl. No. 29/406,203, filed Nov. 10, 2011.
U.S. Appl. No. 29/406,205, filed Nov. 10, 2011.
Office Action dated Aug. 31, 2012 issued in Canadian Design Application No. 145495.
Office Action dated Aug. 31, 2012 issued in Canadian Design Application No. 145496.
Office Action dated Aug. 31, 2012 issued in Canadian Design Application No. 145497.
Office Action dated Aug. 31, 2012 issued in Canadian Design Application No. 145498.
Response dated Dec. 21, 2012 in Canadian Design Application No. 145495.
Response dated Dec. 21, 2012 in Canadian Design Application No. 145496.
Response dated Dec. 21, 2012 in Canadian Design Application No. 145497.
Response dated Dec. 21, 2012 in Canadian Design Application No. 145498.
Notice of Allowance dated Feb. 12, 2013 in U.S. Appl. No. 29/406,199.
Notice of Allowance dated Feb. 12, 2013 in U.S. Appl. No. 29/406,201.
Notice of Allowance dated Feb. 11, 2013 in U.S. Appl. No. 29/406,203.
Notice of Allowance dated Feb. 12, 2013 in U.S. Appl. No. 29/406,205.

* cited by examiner

US 8,944,505 B2

SWIVELING PASSENGER SEAT

CROSS REFERENCE TO RELATED APPLICATION

This application is related to and claims priority benefits from U.S. Provisional Application Ser. No. 61/456,679, filed on Nov. 10, 2010, entitled SWIVELLING AIRCRAFT SEAT, U.S. Provisional Application Ser. No. 61/456,675, filed on Nov. 10, 2010, entitled MULTIBENDABLE SEAT, and U.S. Provisional Application Ser. No. 61/456,673, filed on Nov. 10, 2010, entitled ROTATING HEAD REST. The '679, '675, and '673 applications are hereby incorporated herein in their entireties by this reference.

FIELD OF THE INVENTION

The invention relates to passenger seats or the like.

BACKGROUND

Common carriers, such as passenger airlines, bus lines, train lines, and passenger vehicles frequently include many passenger seats within a passenger cabin for transporting numerous passengers simultaneously. In many cases, to improve passenger comfort, the passenger seats include reclining seat backs that are adjustable by the passengers. The reclining seat backs often include many linkages, parts, and equipment. The number of components required increases the cost of maintenance, the weight of the seat, and the likelihood of seat failure.

Many of these common carriers also provide beverages and/or snacks to passengers during transport. Because passengers are discouraged from moving about the passenger cabin during transport, the beverages and/or snacks are brought to the passengers by common carrier attendants. In passenger cabins with large numbers of passengers or in the case of hazardous travel conditions or other circumstances, some or all of the passengers may not receive beverage and/or snack service during transport. Because many passengers consider these services to be amenities purchased as part of the transportation fare, not providing these services may lead to disgruntled passengers and loss of business.

Thus, it may be desirable to provide passenger seats with adjustable reclining functions that allow passengers to adjust the seats to a desired position, while minimizing the number of components required, as well as providing a way for passengers to access beverages and/or snacks during transport without the need to rely on delivery by custom carrier attendants.

SUMMARY

Embodiments of the present invention include a passenger seat assembly comprising a seat back support, a seat pan coupled to the seat back support, a seat support structure coupled to the seat pan, wherein the seat support structure comprises a mounting channel, and a mounting bar inserted through the mounting channel and coupled to the seat support structure. The mounting bar may be configured to pivotally couple to a passenger cabin, which may include at least one of a side structure and a lower structure of the passenger cabin. The mounting bar may also be configured to rotate the passenger seat assembly between an upright position and a reclined position.

According to certain embodiments, at least one compartment may be coupled to at least one end of the mounting bar. The compartment may be configured to stow at least one of beverages and snacks, and may include a payment processing device that is configured to control access to the compartment.

In other embodiments, the passenger seat assembly may also include a headrest comprising a horizontal track positioned in a curved rear surface of a headrest, a vertical track coupled to a seat back support, and a structure coupled to the horizontal track and the vertical track and configured to overlap at least a portion of the headrest, wherein the headrest is configured to horizontally rotate relative to the structure, and the structure is configured to vertically travel along the track. The headrest may also be configured to pivot from an upright position to a reclined position relative to the seat back support.

In certain other embodiments, the passenger seat assembly may include a plurality of seat support structures, each having a mounting channel, and a mounting bar with a plurality of sections. Each section may be inserted through the mounting channel, coupled to one of the seat support structures, and may be configured to rotate independently of the other sections.

DETAILED DESCRIPTION

Figure 1:
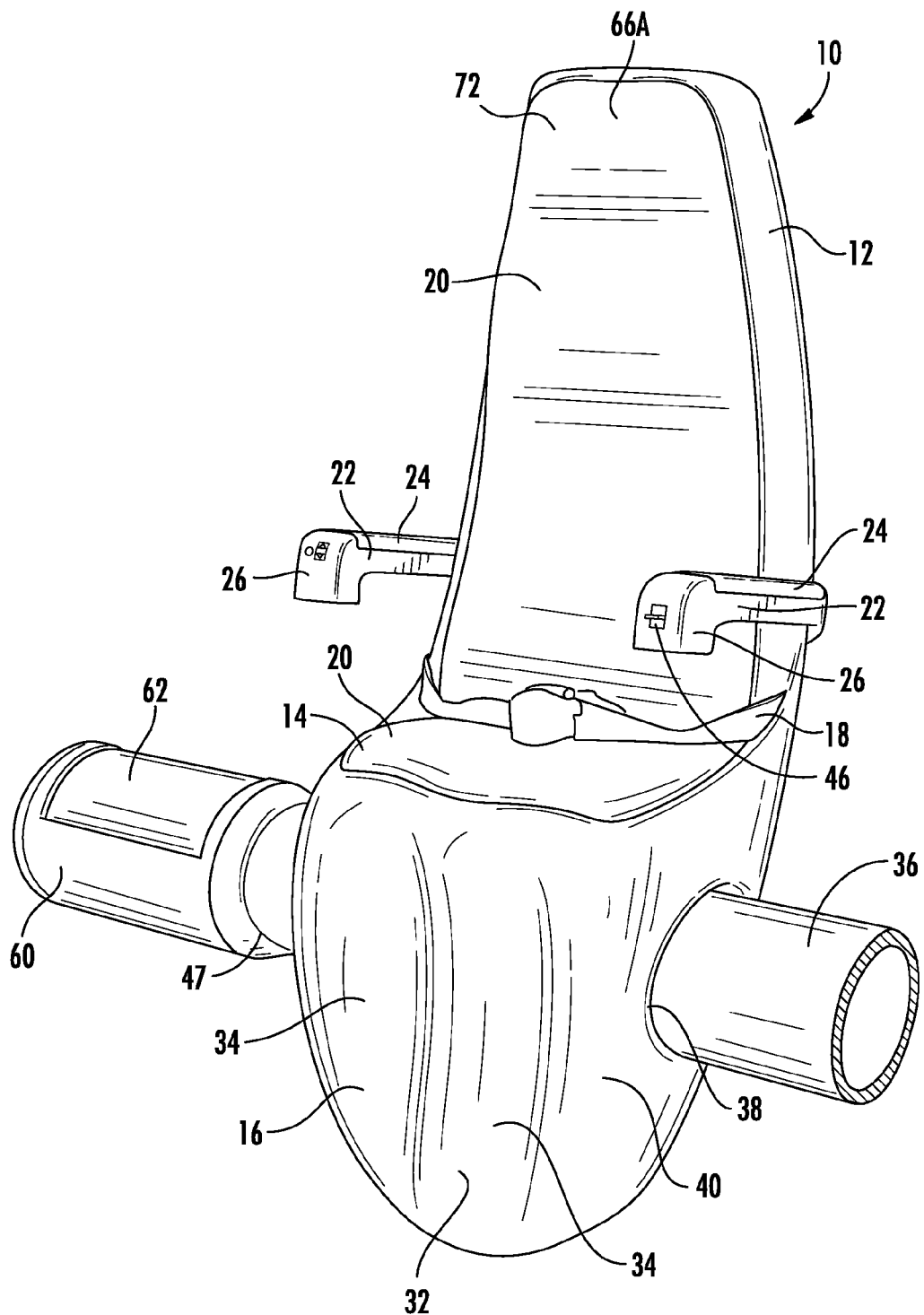
FIG. 1 is a front perspective view of a passenger seat assembly according to some embodiments of the present invention.
Figure 2:
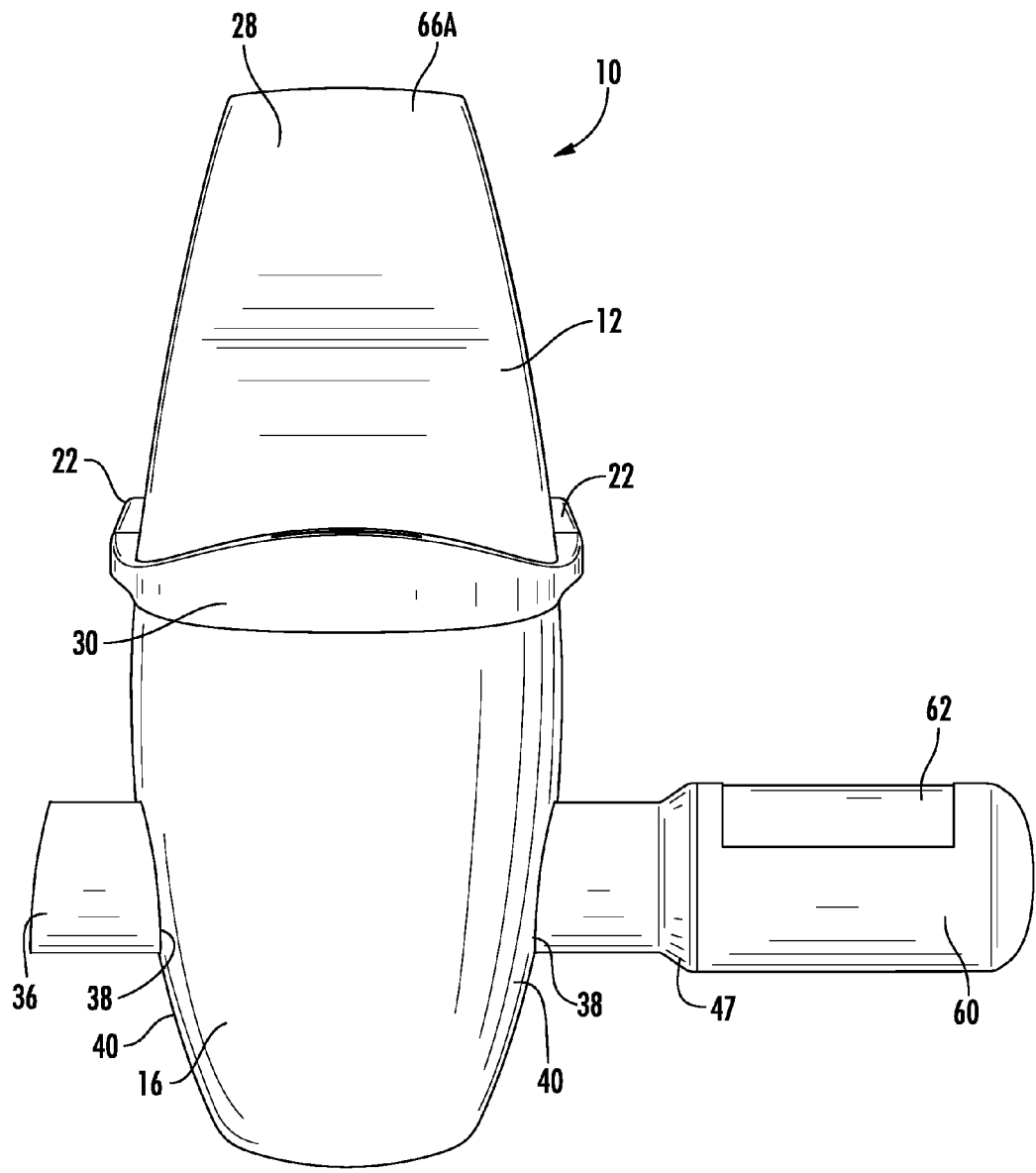
FIG. 2 is a rear view of the passenger seat assembly of FIG. 1.

The described embodiments of the invention provide passenger seat assemblies with a swivel design. While the passenger seat assemblies are discussed for use with aircraft seats, they are by no means so limited. Rather, embodiments of the passenger seat assemblies may be used in passenger seats or other seats of any type or otherwise as desired.

FIGS. 1-22 illustrate embodiments of a passenger seat assembly 10. In these embodiments, the passenger seat assembly 10 comprises at least one seat back support 12, at least one seat pan 14, and at least one seat support structure 16. The seat back support 12, the seat pan 14, and the seat support structure 16 may be formed of materials including but not limited to composite plastics, aluminum, stainless steel, other metallic materials, composite materials, or other similar materials. As illustrated in FIGS. 1, 3, 9-10, 13-15, and 21, a passenger belt 18 may be coupled to the seat back support 12 or the seat pan 14.

In certain embodiments, the seat pan 14 is integrally formed with the seat back support 12 so that the seat back support 12 remains at a fixed angle relative to the seat pan 14. In other embodiments, as shown in FIGS. 1-4, 8-11, 13-15, 17, and 20-21, the seat pan 14, the seat back support 12, and the seat support structure 16 may be integrally molded as a single piece.

In yet other embodiments, the amount of angle between the seat back support 12 and the seat pan 14 may be adjustable to a particular angle by a seat manufacturer or common carrier personnel, then locked into that position so that the seat back support 12 remains at a fixed angle relative to the seat pan 14 during a passenger's use. If a different amount of angle is desired, the seat manufacturer or common carrier personnel may unlock the seat back support 12, rotate the seat back support 12 relative to the seat pan 14 until the desired angle is reached, and then lock the seat back support 12 into position at the new fixed angle.

In further embodiments, as shown in FIGS. 12, 16, 18-19, and 22, the seat pan 14 may be pivotally coupled to the seat back support 12, wherein the amount of angle between the seat back support 12 and the seat pan 14 may be adjustable to a particular angle by a passenger. Any suitable recline mechanism may be used to adjust the position of the seat back support 12 including but not limited to a recline lock or other suitable mechanism that releasably locks the seat back support 12 at any suitable position between and including the fully upright and fully reclined positions.

In some embodiments, such as the embodiments shown in FIGS. 1, 3, 9-10, 13-15, and 21, a cushion 20 may be coupled to the seat back support 12 and/or to the seat pan 14. The cushion 20 may also serve as a flotation device. In these embodiments, to perform as a flotation device, the cushion 20 includes some amount of flotation material including but not limited to closed-cell foams and flotation foams. In other embodiments, the cushion 20 may not serve as a flotation device and may include any suitable cushion material that provides the desired amount of comfort and support to the passenger.

In certain embodiments, as shown in FIGS. 1, 3-4, 9-11, 13-15, 17, and 20-21, a pair of arm rests 22 may be coupled to the seat back support 12. Each arm rest 22 may include a cushion 24.

FIGS. 1, 3-4, 9-11, 13-15, 17, and 20-21 illustrate further embodiments where the cushion material of the cushions 20 and/or the cushions 24 may be formed of gel or other suitable cushioning material and covered with a fabric that may include but is not limited to natural materials such as cotton, wool, leather, synthetic materials such as polyester, polyamide, vinyl, acrylic, polyethylene, elastic polyurethane, and polyurethane-polyurea copolymers, and/or a blend of natural and synthetic materials, or other suitable materials.

As best shown in FIGS. 1, 3, 9-10, 13-15, and 21, an end 26 of one of the arm rests 22 may include power and/or audio receptacles, sound controls, a control panel with lighting switches, flight attendant call buttons, in-flight entertainment controls, recline control, or any other suitable control mechanism related to operation of the passenger seat assembly 10 or any of its amenities.

According to certain embodiments illustrated in FIGS. 2, 4, 11, 17, and 20, a rear surface 28 of the seat back support 12 comprises a storage compartment 30. The storage compartment 30 may be formed of the same materials used to form the seat back support 12, thus providing the storage compartment 30 with a rigid structure. In other embodiments, the storage compartment 30 may be formed from a fabric or other flexible materials that may provide a flexible structure. Such fabrics include but are not limited to natural materials such as cotton, wool, leather, synthetic materials such as polyester, polyamide, vinyl, acrylic, polyethylene, elastic polyurethane, and polyurethane-polyurea copolymers, and/or a blend of natural and synthetic materials, or other suitable materials.

In some embodiments, as shown in FIGS. 1-4, 9-11, 13-15, 17, and 20-21, the seat support structure 16 is coupled to the seat pan 14. In these embodiments, the seat support structure 16 comprises a support surface 32 that is configured to contact and support a passenger's legs. The support surface 32 may include niches 34 that are shaped to substantially contour at least a portion of the passenger's legs. The support surface 32 may optionally include leg cushions within the niches 34 to provide additional comfort and support to the passenger. The leg cushions may be formed of gel and covered with a fabric formed of natural materials such as cotton, wool, leather, synthetic materials such as polyester, polyamide, vinyl, acrylic, polyethylene, elastic polyurethane, and polyurethane-polyurea copolymers, and/or a blend of natural and synthetic materials, or other suitable materials.

The seat support structure 16 may be coupled to a mounting bar 36, as shown in FIGS. 1-3, 5, 8-10, 13-15, and 20-21. The mounting bar 36 may be formed of materials including but not limited to aluminum, stainless steel, other metallic materials, composite materials, or other similar materials. The mounting bar 36 may pass through a mounting channel 38 that connects each side 40 of the seat support structure 16.

An end 42 of the mounting bar 36 may be pivotally coupled to a side structure 43 of a passenger cabin 44 in an aircraft or other vehicle. The pivotal coupling between the end 42 of the mounting bar 36 and the side structure 43 of the passenger cabin 44 may include any suitable fastening mechanism including but not limited to bolts, rivets, welding, or other suitable mechanisms that allow the end 42 to rotate relative to the side structure 43 of the passenger cabin 44. In these embodiments, the passenger seat assembly 10 may not be connected to a lower structure 45 of the passenger cabin 44.

In other embodiments, one or both ends 42 of the mounting bar 36 may be pivotally coupled to a lower structure 45 of the passenger cabin 44. In these embodiments, the mounting bar 36 may be pivotally coupled to the lower structure 45 of the passenger cabin 44 for additional structural stability and support as needed. The pivotal coupling between one or both ends 42 of the mounting bar 36 and the lower structure 45 may include any suitable fastening mechanism including but not limited to bolts, rivets, welding, or other suitable mechanisms that allow the end(s) 42 to rotate relative to the lower structure 45. In some embodiments, an extension may be used to pivotally couple the mounting bar 36 to the lower structure 45.

To recline the passenger seat assembly 10, a passenger actuates a switch 46, which causes the mounting bar 36 to rotate relative to its mounting location (the side structure 43 or the lower structure 45 of the passenger cabin 44). In some embodiments, a rotational controller 47 is operated by the switch 46 on the passenger seat assembly 10. The mounting bar 36 may be coupled to the rotational controller 47 adjacent the mounting location or other suitable location. One of ordinary skill in the relevant art will understand that examples of suitable rotational controllers may include but are not limited to motors, drivers, gas locks, spring-loaded devices, or other suitable devices that may apply a rotational force to the mounting bar 36, while also preventing rotation of the mounting bar 36 when the switch 46 is disengaged.

When the passenger actuates the switch 46 in a reclining direction, the switch 46 directs the rotational controller 47 to rotate the mounting bar 36 in a reclining direction. The reclining rotation of the mounting bar 36 stops when the passenger releases the switch 46 or when the mounting bar 36 has been rotated the full amount allowed by the rotational controller 47 in the reclining direction. FIGS. 4, 8, 11, and 17 illustrate the passenger seat assemblies 10 in various reclining positions. Conversely, when the passenger actuates the switch 46 in an upright direction, the switch 46 directs the rotational controller 47 to rotate the mounting bar 36 in an upright direction. The upright rotation of the mounting bar 36 stops when the passenger releases the switch 46 or when the mounting bar 36 has been rotated the full amount allowed by the rotational controller 47 in the upright direction.

Figure 3:
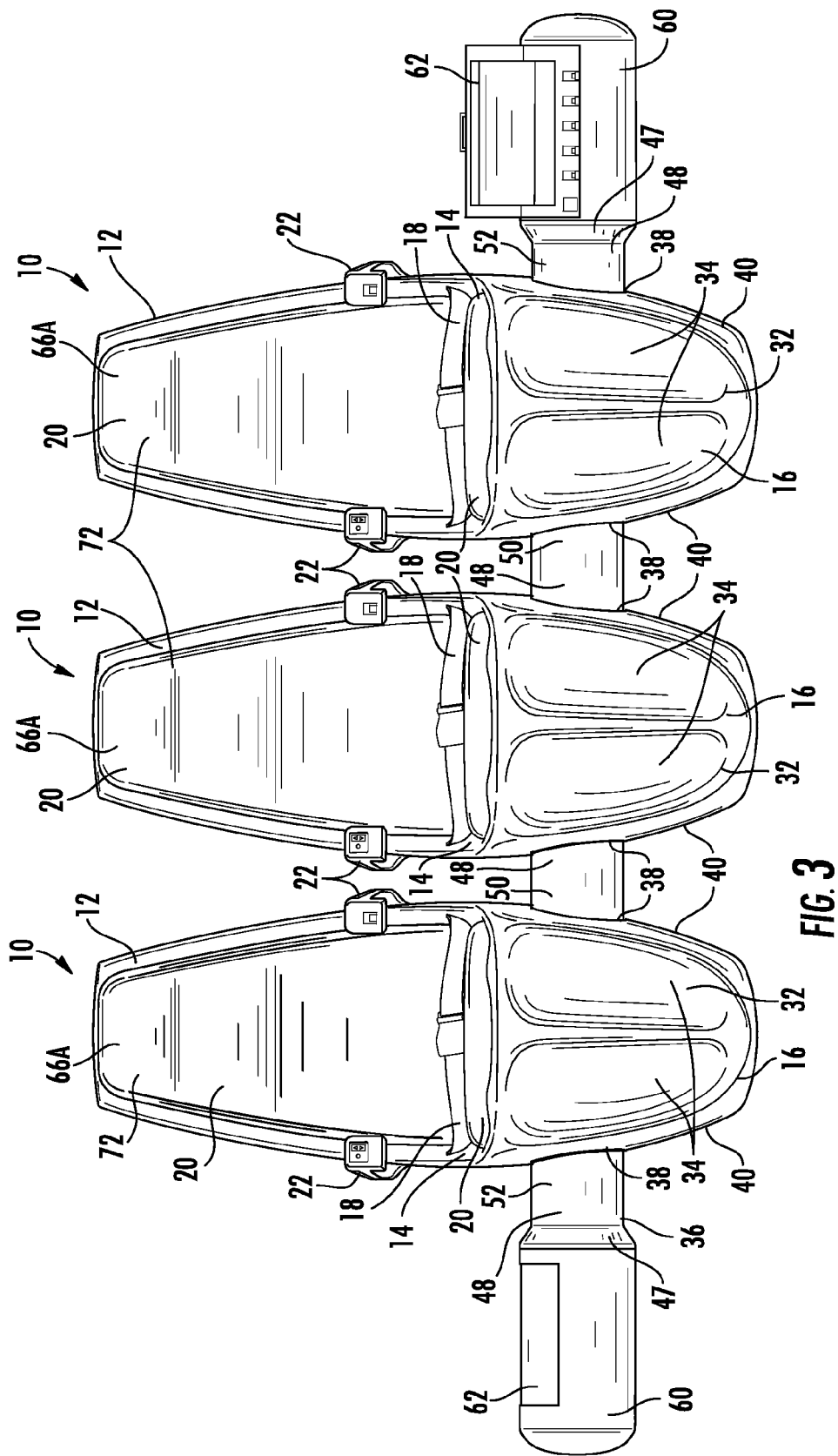
FIG. 3 is a front view of a plurality of passenger seat assemblies of FIG. 1.
Figure 4:
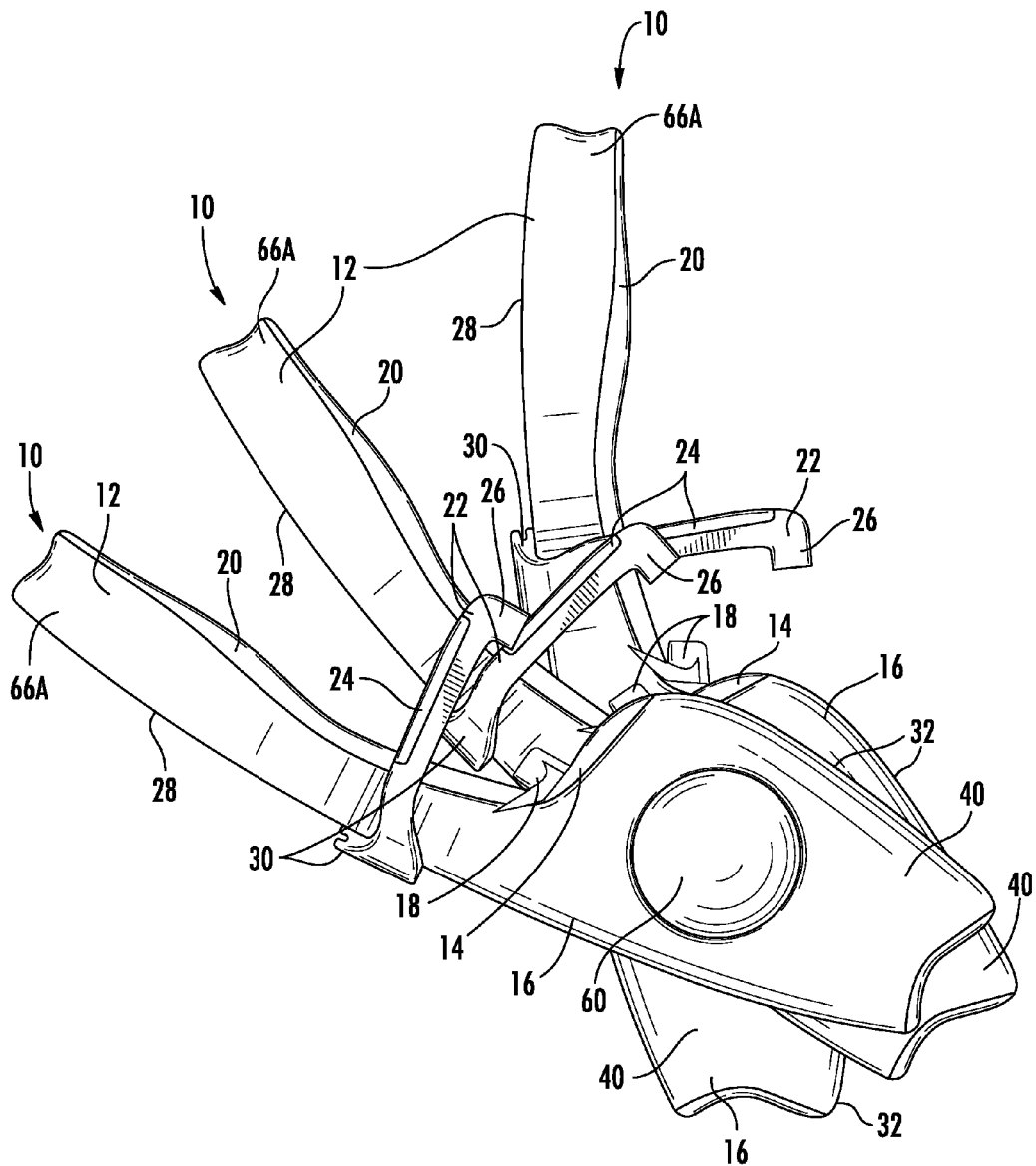
FIG. 4 is a side view of the plurality of passenger seat assemblies of FIG. 3.
Figure 5:
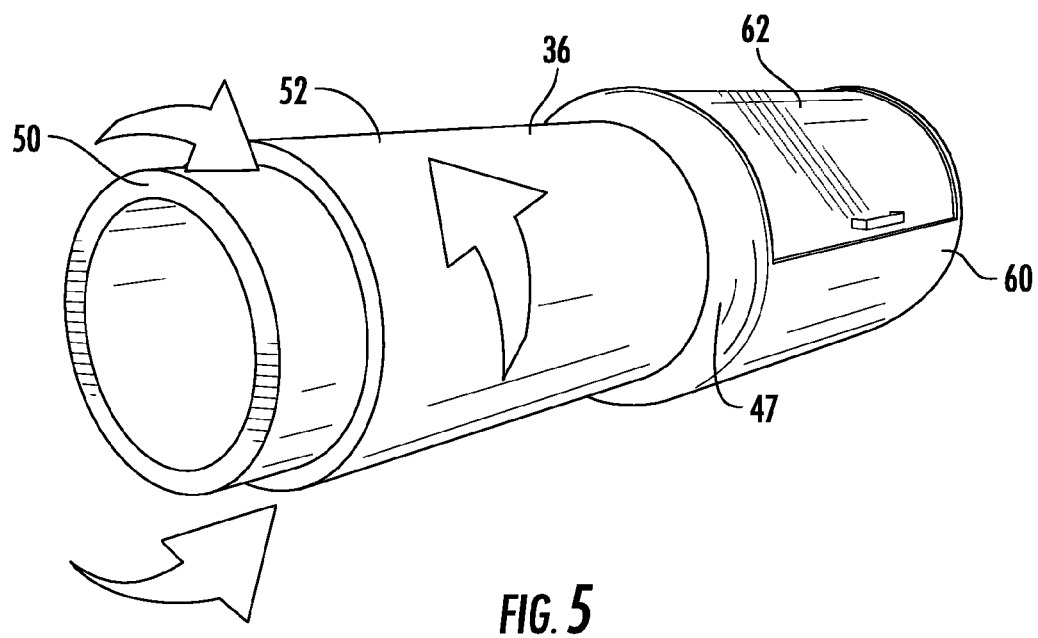
FIG. 5 is a partial perspective view of a mounting bar of the plurality of passenger seat assemblies of FIG. 3.

According to certain embodiments, as shown in FIGS. 3, 4, 8, 11, and 17, a plurality of passenger seat assemblies 10 may be mounted to the mounting bar 36. In these embodiments, as best shown in FIGS. 3 and 5, the mounting bar 36 may include a plurality of sections 48 that rotate independently of one another. For example, the plurality of sections 48 may be nested so that each section 48 is coupled to at least one rotational controller 47. In these embodiments, each section 48 may be coupled to a separate rotational controller 47 that is operated by the switch 46 on each passenger seat assembly 10.

In some embodiments, an inner section 50 may be pivotally coupled to a mounting location adjacent one or both ends 42. A pair of outer sections 52 may be configured to overlap a portion of each end 42 of the inner section 50. One or both outer sections 52 is pivotally coupled to the mounting location adjacent one or both ends 42 of the mounting bar 36. Each outer section 52 may be coupled to a separate rotational controller 47 adjacent the mounting location or other suitable location. Thus, in this arrangement, the center passenger seat assembly 10 is mounted to the inner section 50, which in turn provides the reclining motion of the center passenger seat assembly 10. The passenger seat assembly 10 located adjacent each end 42 of the mounting bar 36 may be coupled to the outer section 52 adjacent that location. Each outer section 52 provides the reclining motion of the passenger seat assembly 10 to which it is coupled. As a result, the reclining/upright rotation of each passenger seat assembly 10 may be controlled independently of the reclining/upright rotation of the other passenger seat assemblies 10 coupled to the same mounting bar 36.

Figure 6:
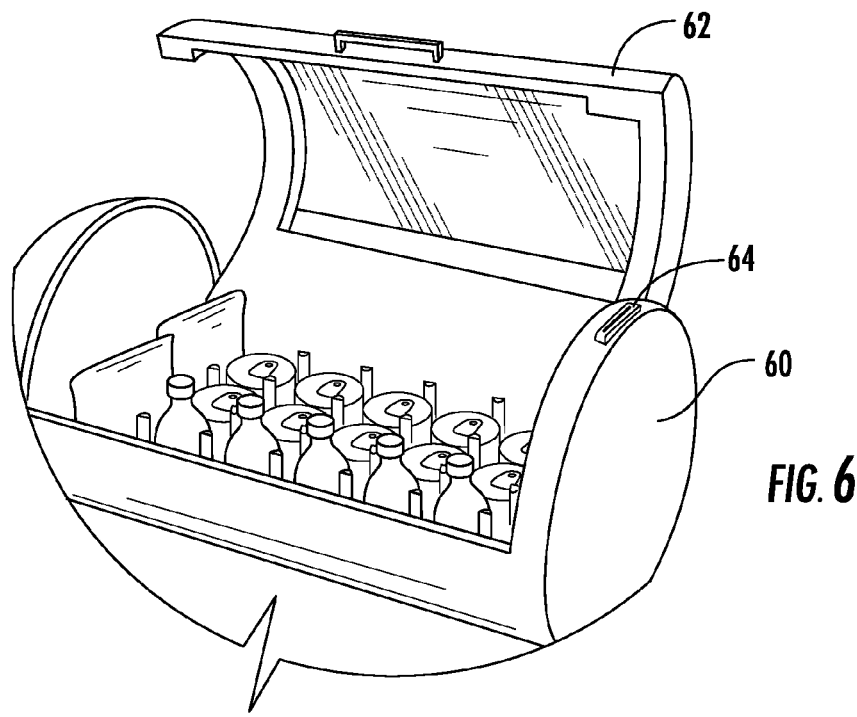
FIG. 6 is a partial perspective view of a compartment of the passenger seat assembly of FIG. 1.
Figure 7:
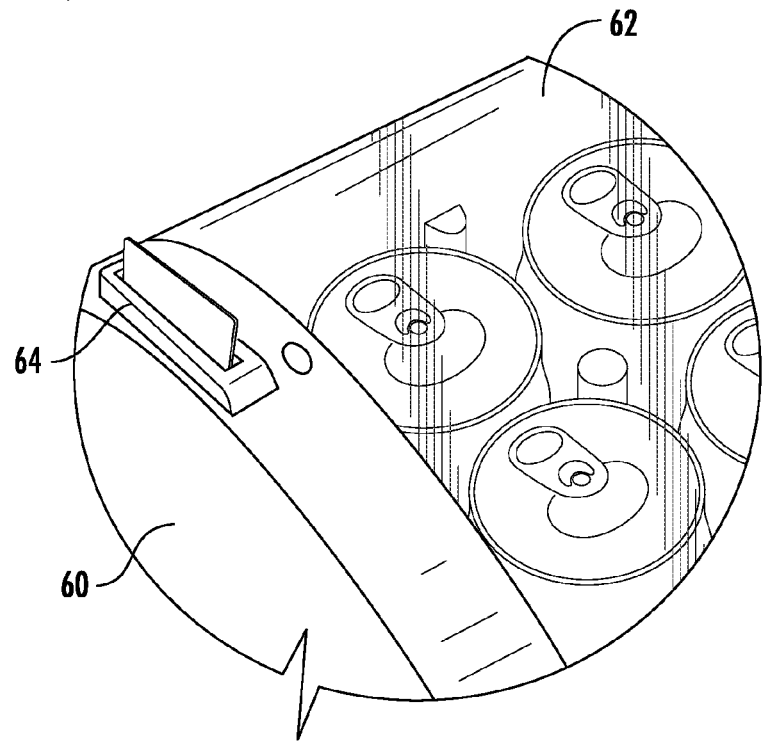
FIG. 7 is a partial perspective view of the compartment of FIG. 6.
Figure 8:
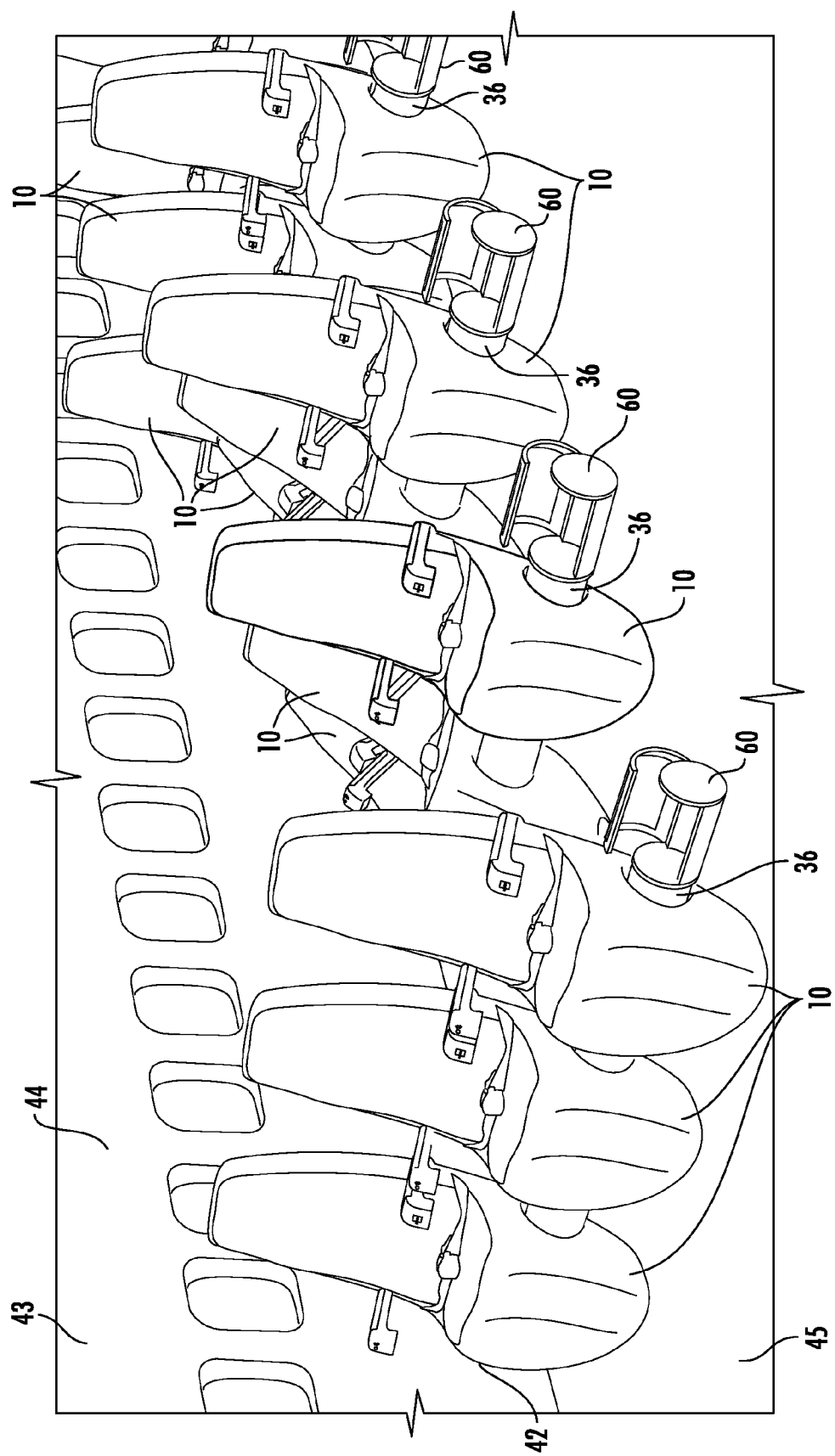
FIG. 8 is a perspective view of a plurality of passenger seat assemblies of FIG. 1 in a passenger cabin.

In some embodiments, as shown in FIGS. 1-11, 13-15, 17, and 20-21, at least one compartment 60 may be positioned adjacent one or both sides 40 of the seat support structure 16. In some embodiments, the compartment 60 may provide additional stowage locations for the passenger seated in the passenger seat assembly 10. In other embodiments, as shown in FIGS. 3 and 6-7, the compartment 60 may be configured to stow at least one of beverages and snacks that a passenger may access by opening a lid 62. Inclusion of these compartments 60 may reduce or eliminate the need for beverage and/or snack service.

In other embodiments, the compartment 60 may be configured as a vending machine. In these embodiments, as shown in FIGS. 6-7, the compartment 60 includes a payment processing device 64. To access the contents of the compartment 60, a passenger inserts a payment device, such as a credit card, debit card, ATM card, prepaid vending card that may be issued by the common carrier, or other form of payment through the device 64, which then releases the lid 62. When the passenger has removed the selected items from the compartment 60, the passenger closes the lid 62, which signals an end to the transaction. The device 64 may be configured to place a fixed access fee on the passenger's payment device. Alternatively, the device 64 may include sensors and/or a processor that detect empty bins and determine which items were removed from the compartment 60 after the lid 62 is closed. The device 64 may then be configured to place a charge for each removed item on the passenger's payment device.

In certain embodiments, as shown in FIGS. 1-8, the seat back support 12 may include a headrest 66A. In certain embodiments, the headrest 66A may be fixedly coupled to the seat back support 12. In other embodiments, the headrest 66A may be integrally formed with the seat back support 12 so that the headrest 66A remains at a fixed position relative to the seat back support 12. In yet other embodiments, the headrest 66A may be pivotally coupled to the seat back support 12.

Figure 9:
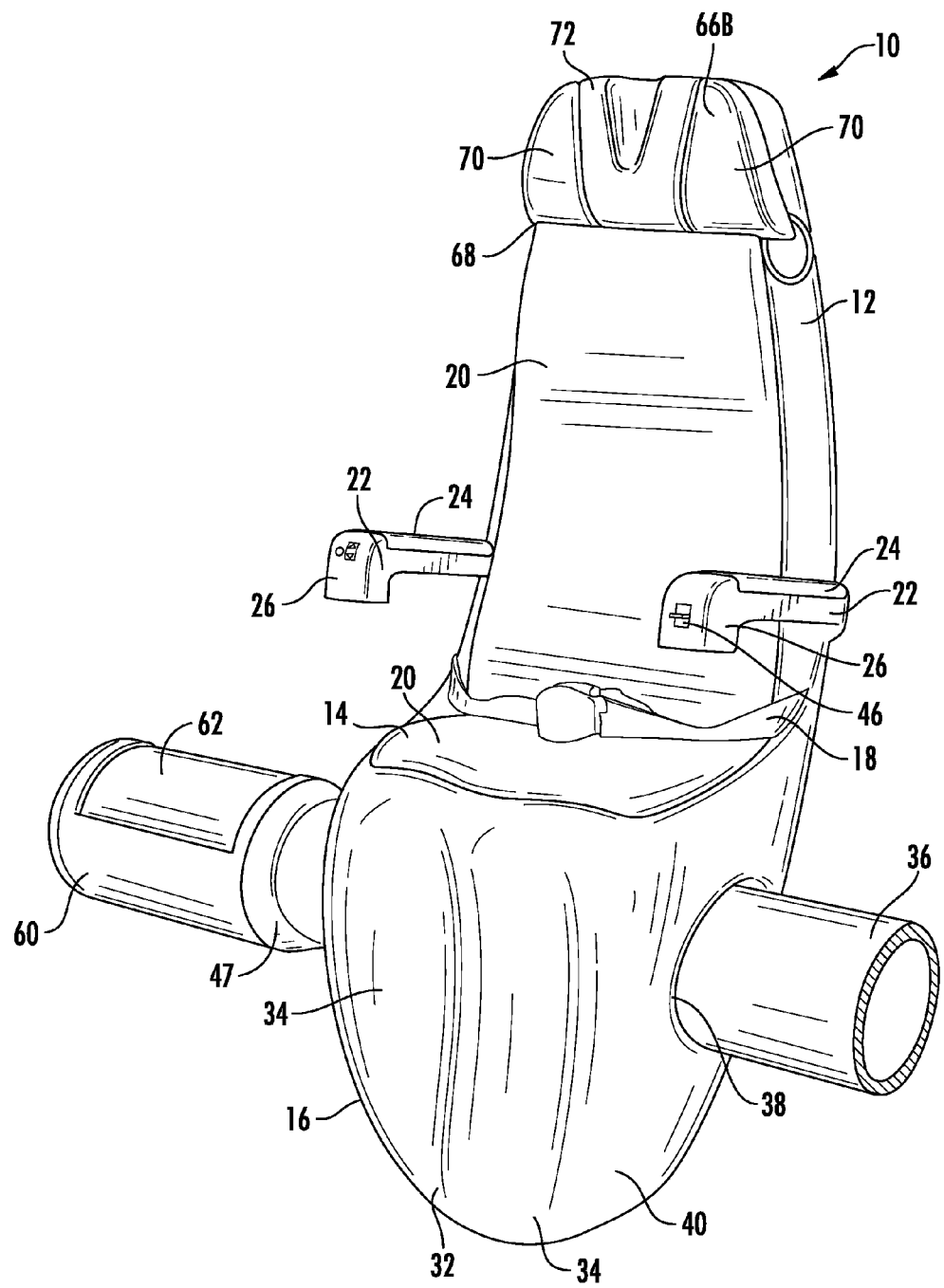
FIG. 9 is a front perspective view of a passenger seat assembly according to some embodiments of the present invention.
Figure 10:
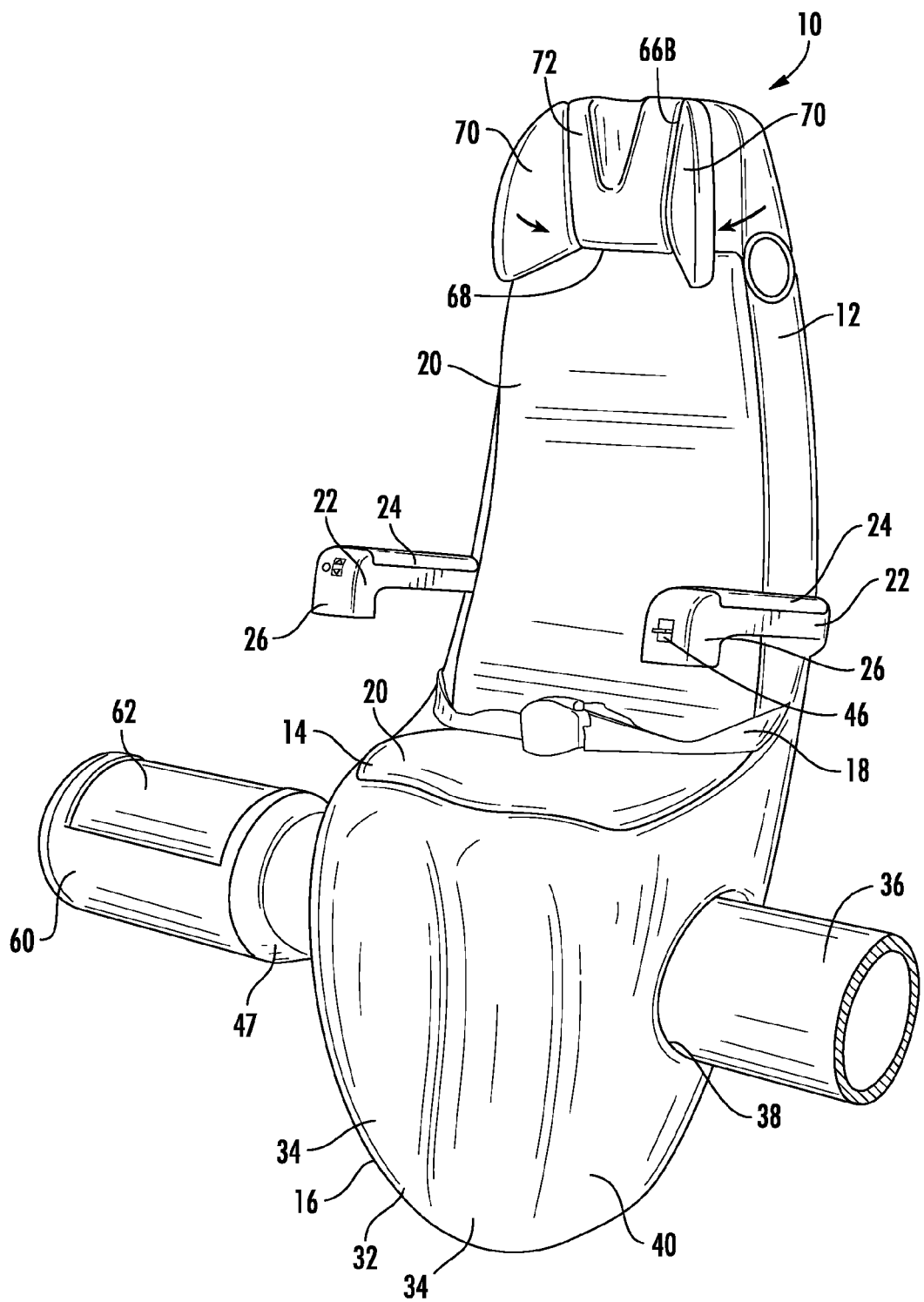
FIG. 10 is a front perspective view of the passenger seat assembly of FIG. 9 with wings of a headrest in a deployed position.
Figure 11:
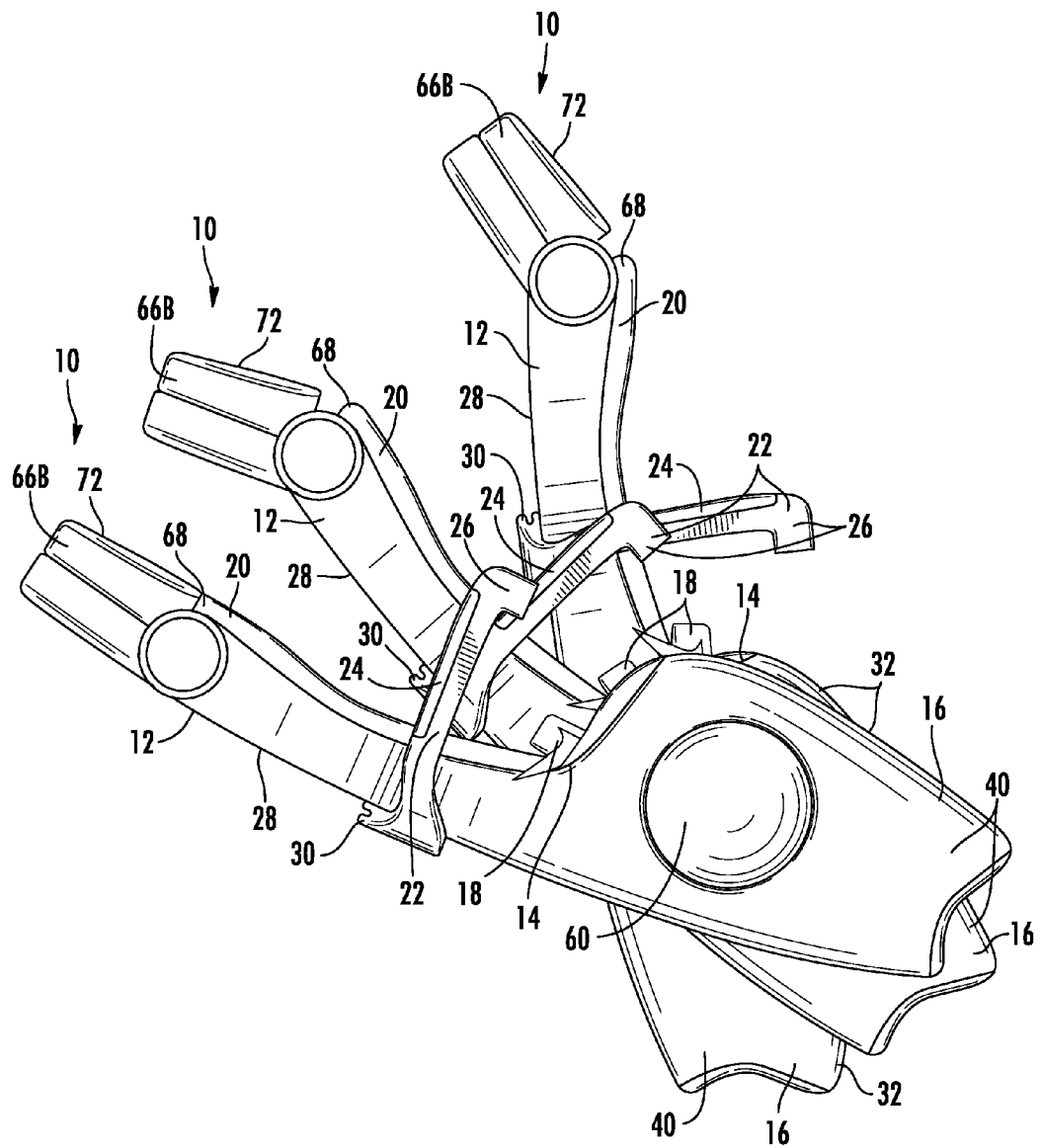
FIG. 11 is a side view of a plurality of passenger seat assemblies of FIG. 9.
Figure 12:
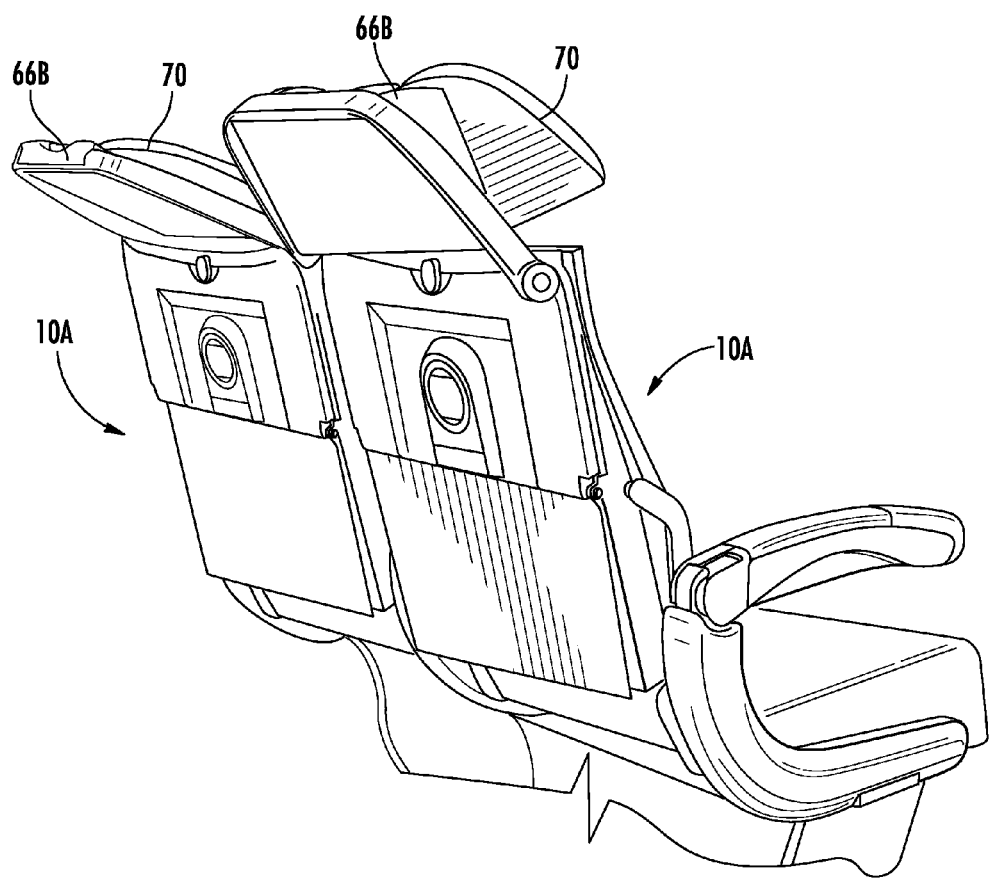
FIG. 12 is a rear perspective view of a plurality of passenger seat assemblies according to some embodiments of the present invention.

In other embodiments, as shown in FIGS. 9-11, a headrest 66B may be pivotally coupled to an upper edge 68 of the seat back support 12. In these embodiments, a passenger may rotate the headrest 66B into any suitable angled position relative to the upper edge 68 of the seat back support 12. The headrest 66B may further comprise a pair of wings 70 that are pivotally coupled to the headrest 66B. In a stowed position, the wings 70 are positioned approximately flush with a surface 72 of the headrest 66B. One or both wings 70 may be rotated some distance away from the surface 72 to any suitable desired deployed position ranging from the stowed position (as shown in FIG. 9) to a fully deployed position (as shown in FIG. 10). As illustrated in FIG. 12, the headrest 66B may be coupled to any suitable type of passenger seat assembly 10A.

Figure 13:
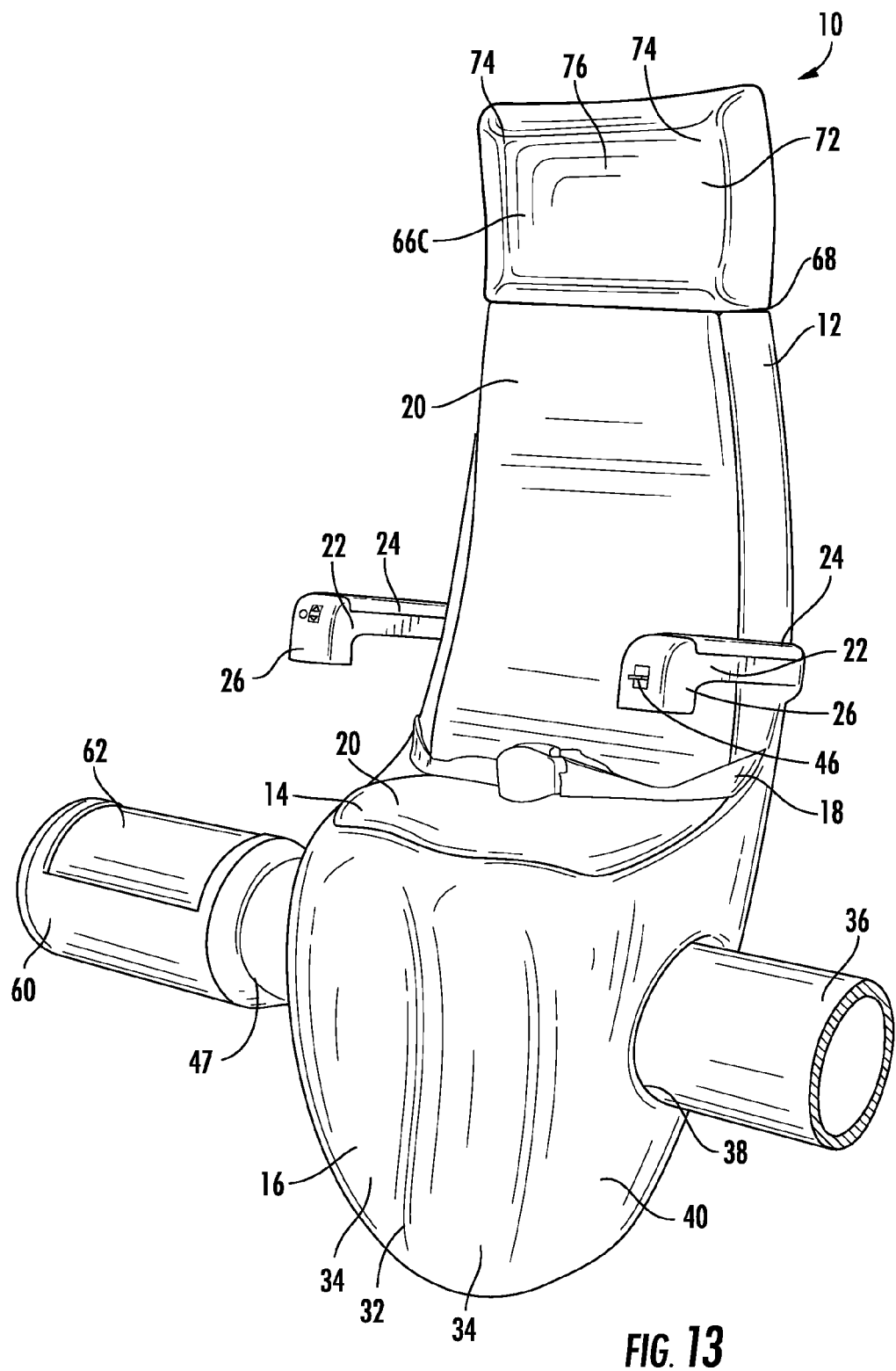
FIG. 13 is a front perspective view of a passenger seat assembly according some embodiments of the present invention.
Figure 14:
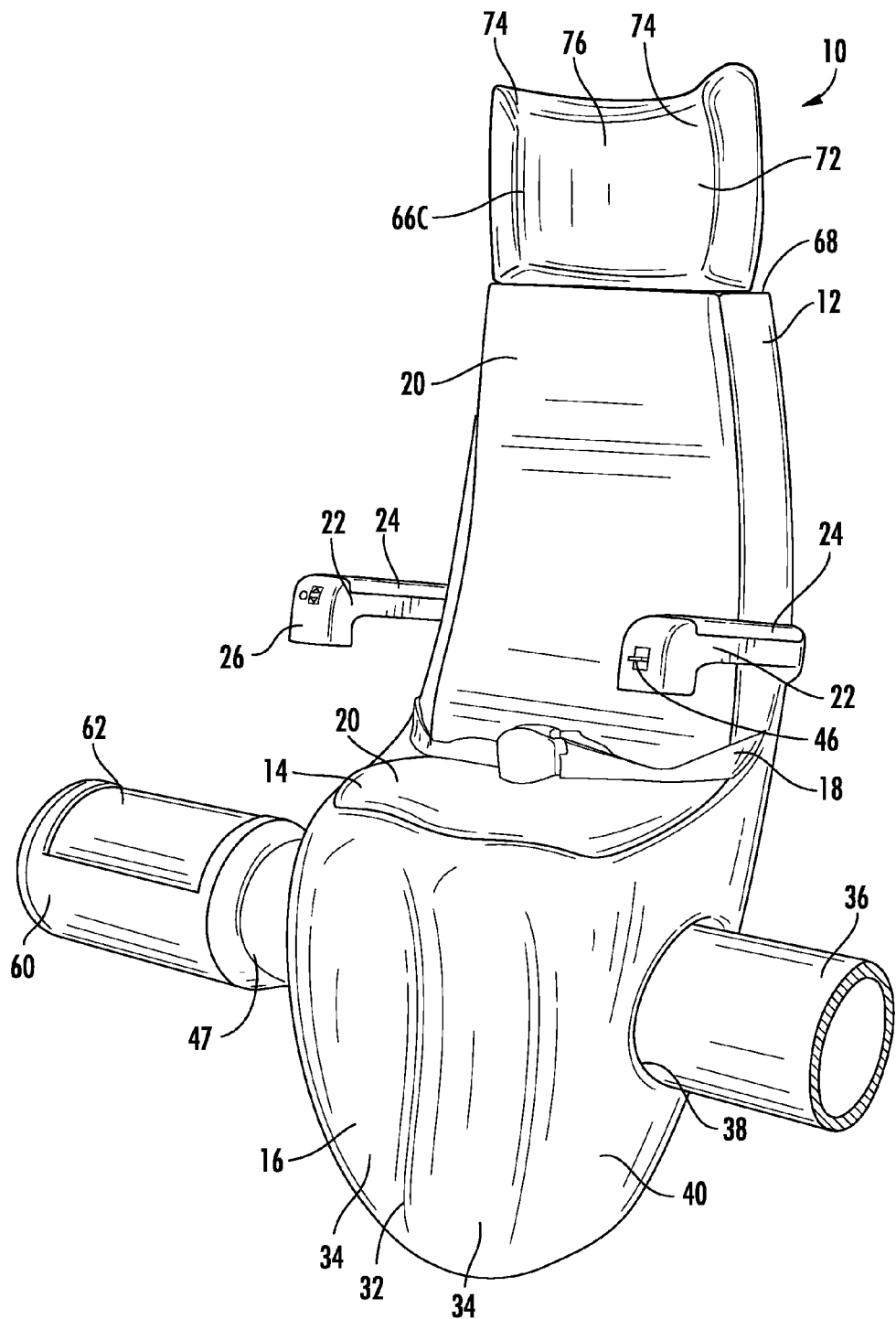
FIG. 14 is a front perspective view of the passenger seat assembly of FIG. 13 with bendable sides of a headrest in a deployed position.
Figure 15:
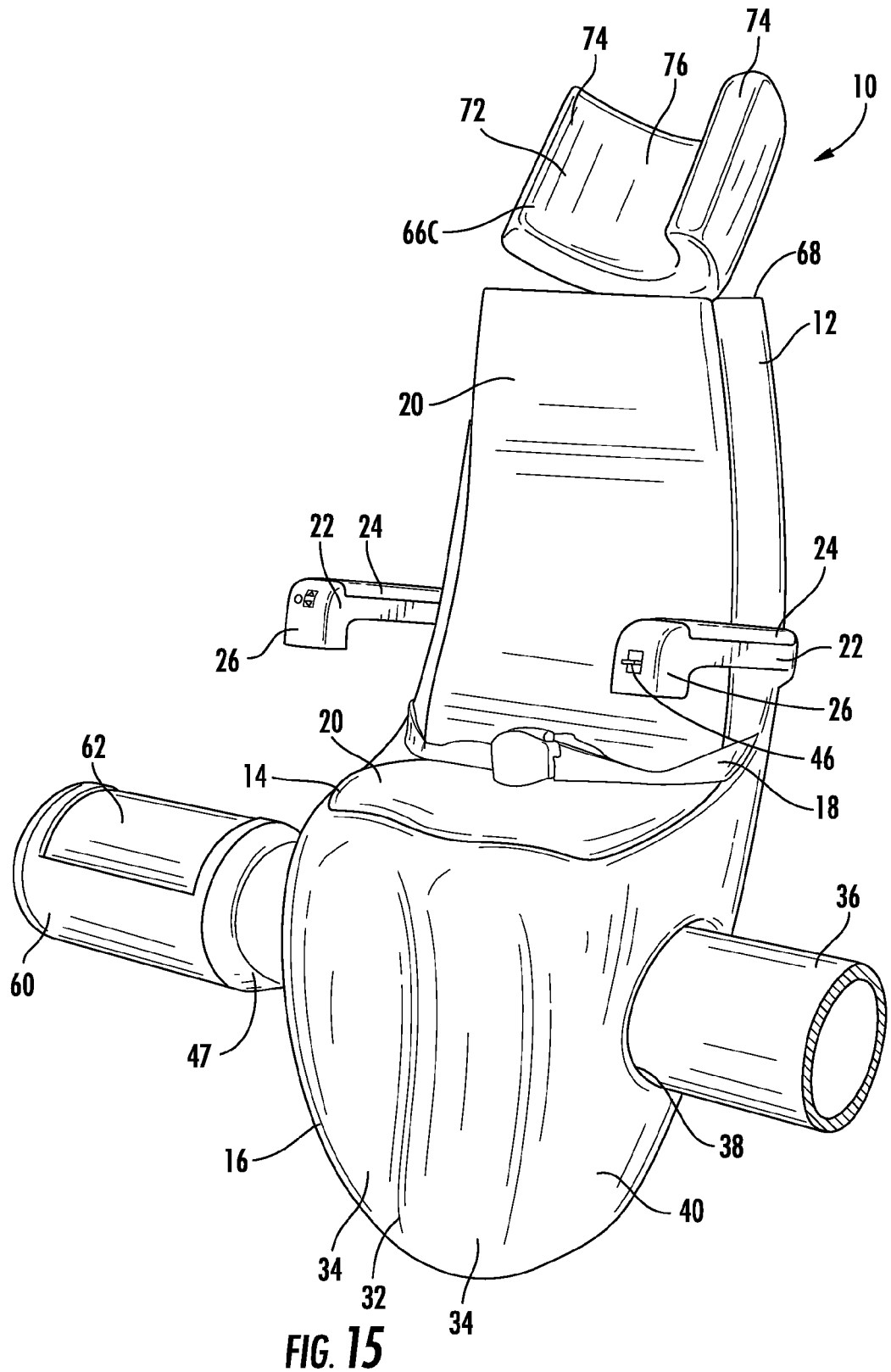
FIG. 15 is a front perspective view of the passenger seat assembly of FIG. 13 with bendable sides of a headrest in a deployed position and the headrest in a reclined position.
Figure 16:
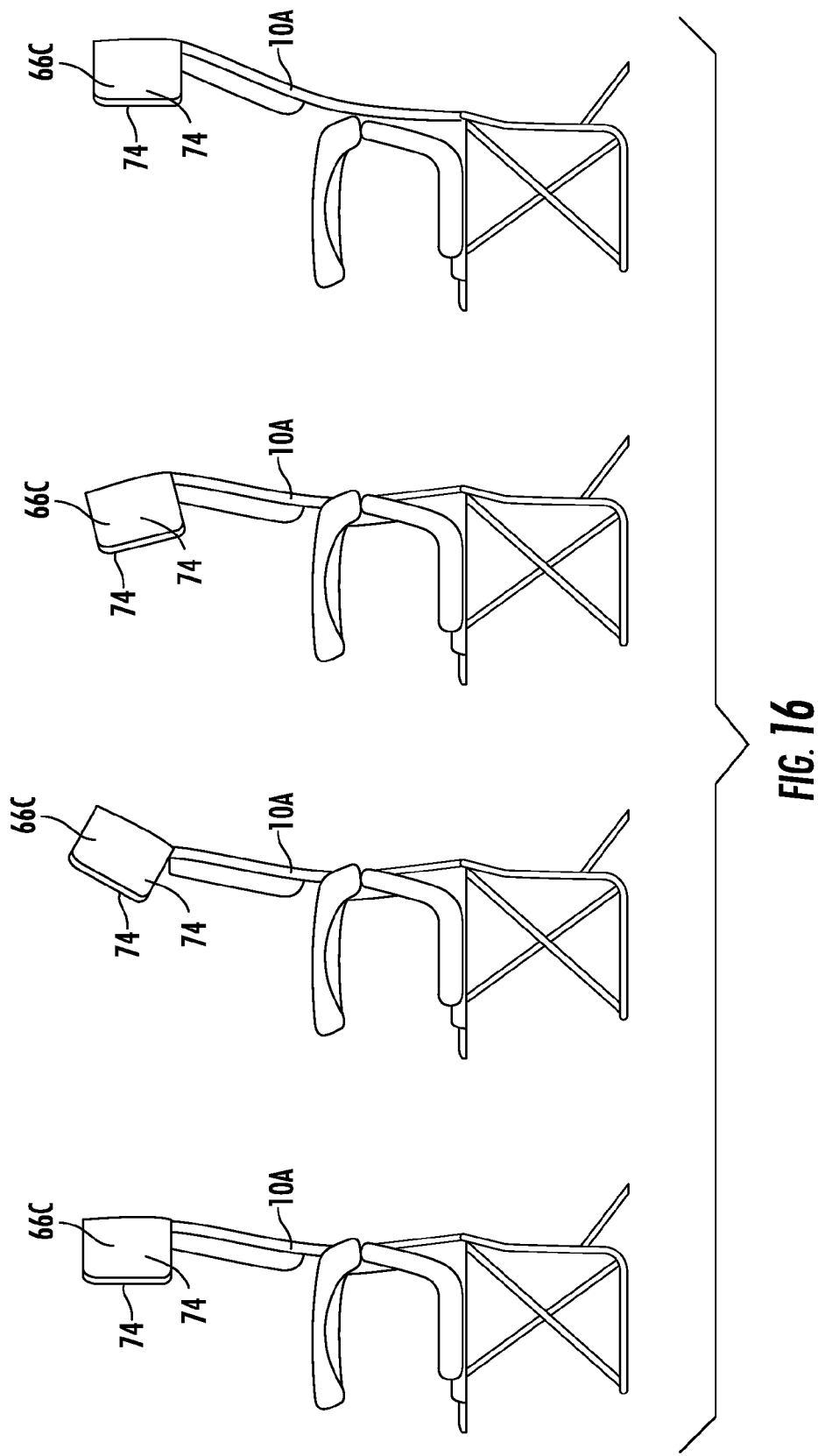
FIG. 16 is a side view of a plurality of passenger seat assemblies according to some embodiments of the present invention.

In certain other embodiments, as shown in FIGS. 13-15, a headrest 66C may be pivotally coupled to the upper edge 68 of the seat back support 12. In these embodiments, a passenger may rotate the headrest 66C into any suitable angled position relative to the upper edge 68 of the seat back support 12 ranging from an upright position (as shown in FIGS. 13-14) to a reclined position (as shown in FIG. 15). The headrest 66C may further comprise bendable sides 74. In a stowed position, as shown in FIG. 13, the bendable sides 74 are positioned approximately planar with a central portion 76 of the headrest 66C. FIGS. 14-15 illustrate that one or both bendable sides 74 may be bent into a deployed position that substantially conforms to at least a portion of a side of a passenger's head. As illustrated in FIG. 16, the headrest 66C may be coupled to any suitable type of passenger seat assembly 10A.

Figure 17:
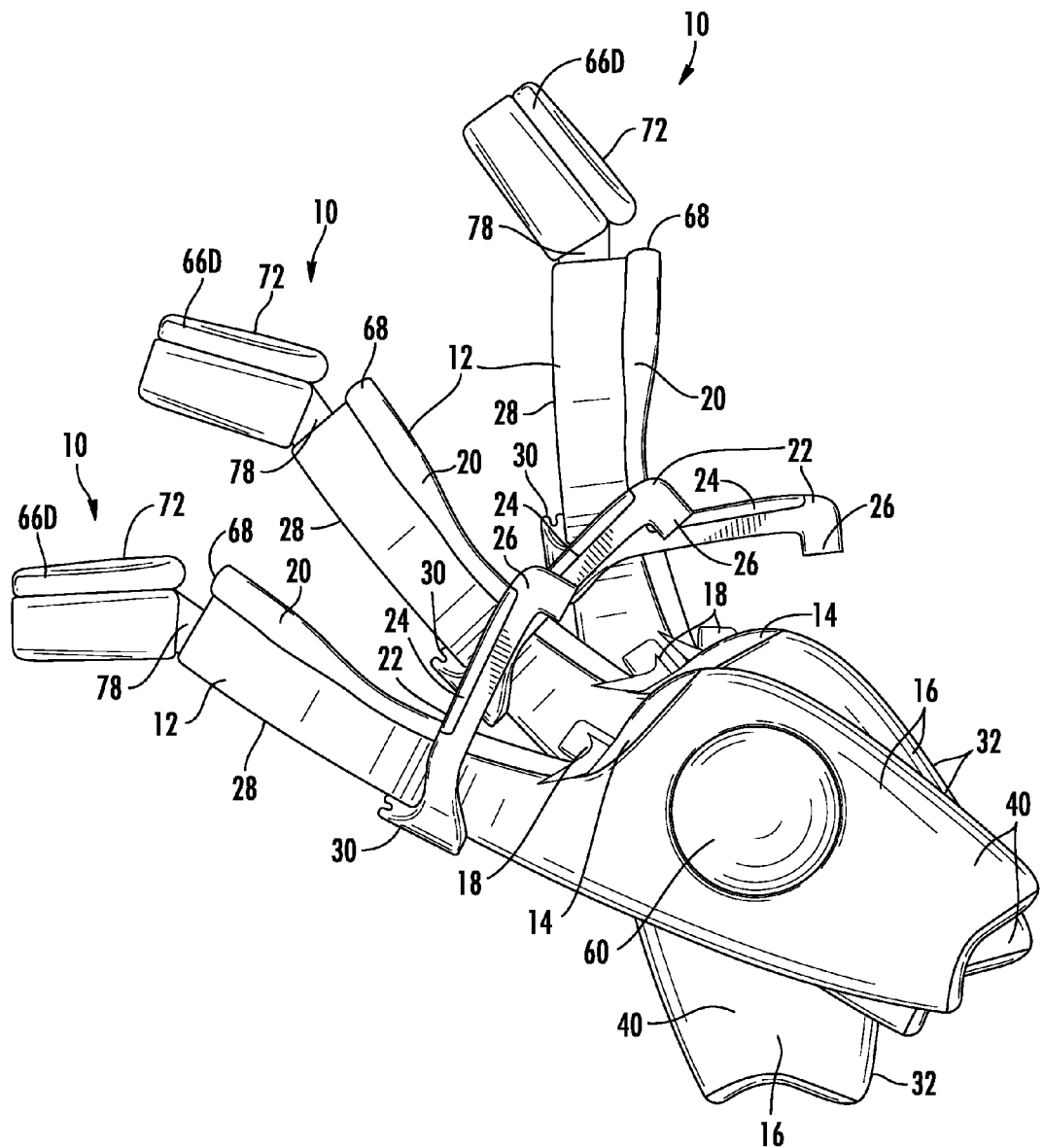
FIG. 17 is a side view of a plurality of passenger seat assemblies according to some embodiments of the present invention.
Figure 19:
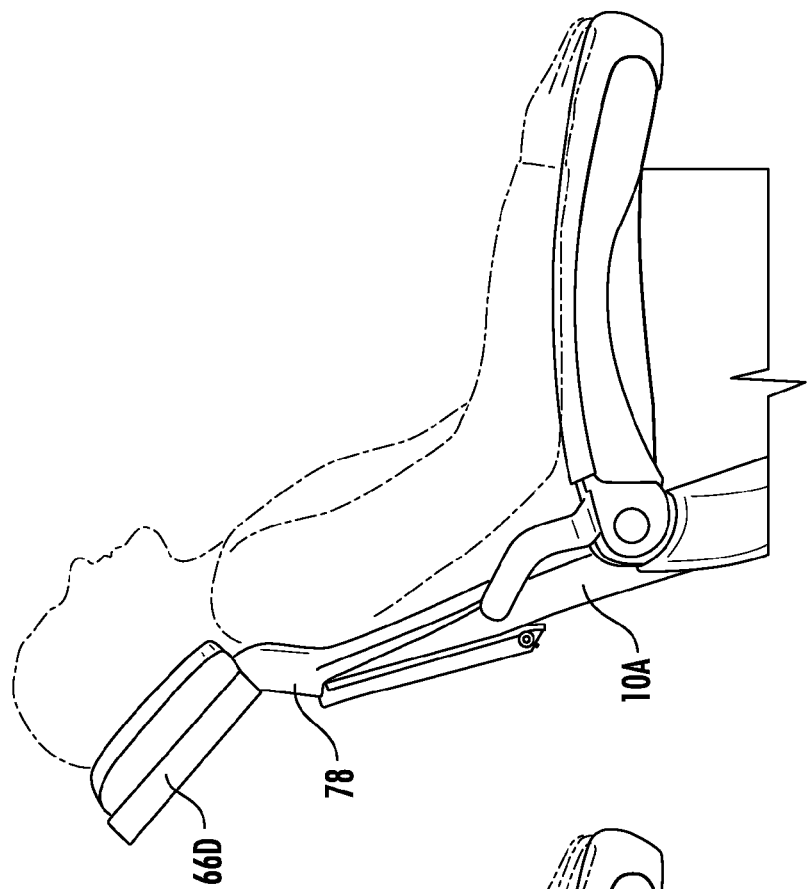
FIG. 19 is a side view of the passenger seat assembly of FIG. 18 with a headrest in a retracted position.
Figure 18:
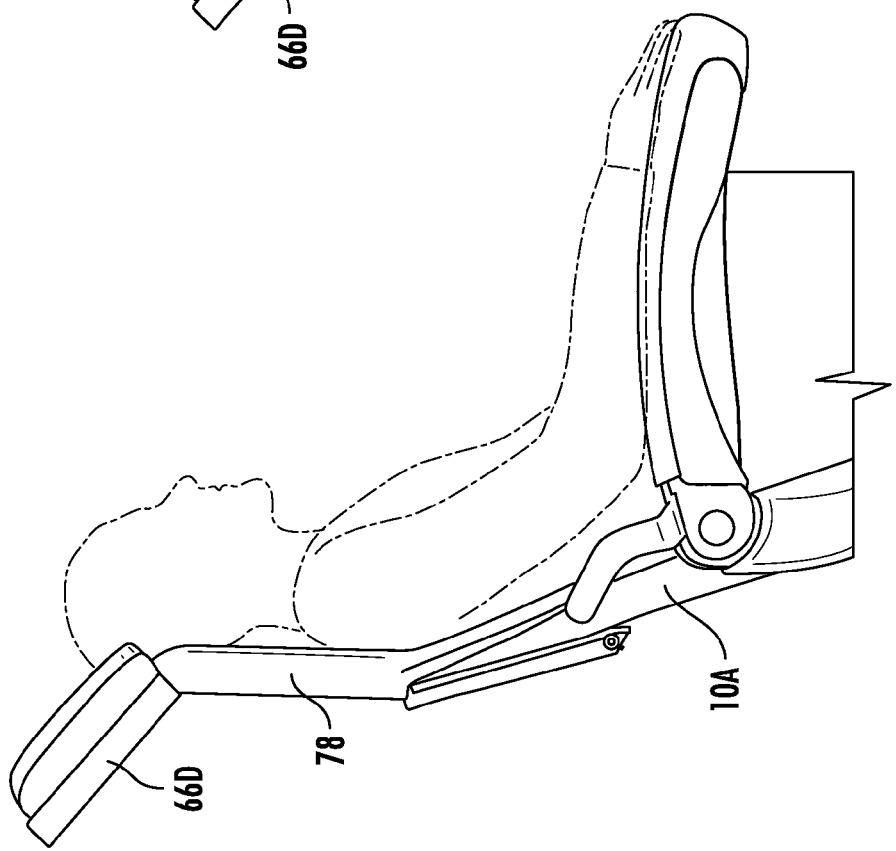
FIG. 18 is a side view of a passenger seat assembly according to some embodiments of the present invention.

In yet other embodiments, as shown in FIGS. 17-19, a headrest 66D may be fixedly coupled at a predetermined angle to an extension column 78. In these embodiments, the headrest 66D remains at a fixed angled position relative to the extension column 78. When a passenger wishes to use the reclining headrest 66D, the passenger lowers the extension column 78 into a retracted position (as shown in FIGS. 17 and 19), wherein the reclined headrest 66D is adjacent a back of the passenger's head and/or neck. If passenger does not wish to recline his or her head against the reclined headrest 66D, the passenger raises the extension column 78 into an extended position (as shown in FIG. 18), wherein the reclined headrest 66D is adjacent or above a top of the passenger's head. In the extended position, the passenger's head may rest against the extension column 78. As illustrated in FIGS. 18-19, the headrest 66D may be coupled to any suitable type of passenger seat assembly 10A.

Figure 20:
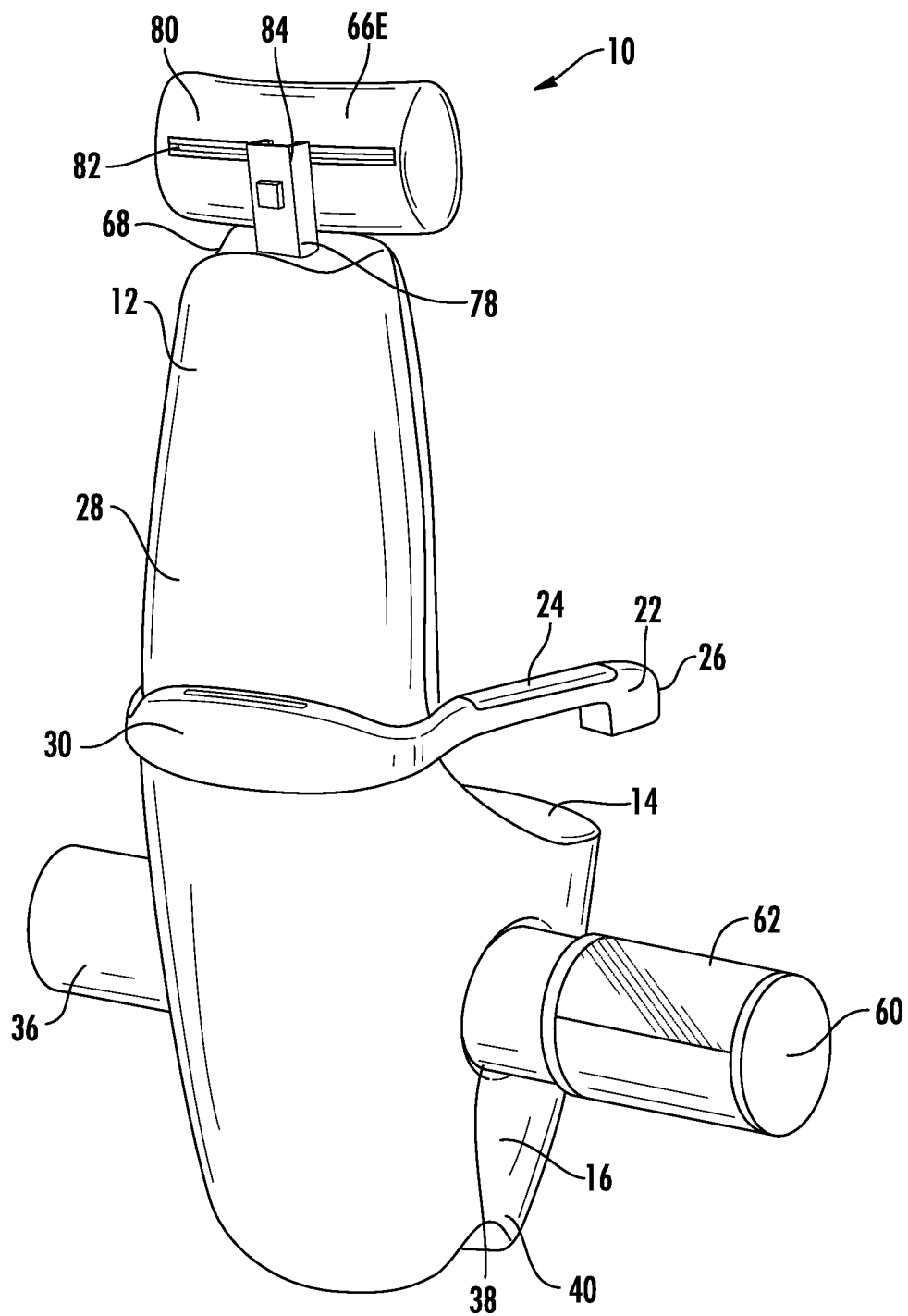
FIG. 20 is a rear perspective view of a passenger seat assembly according to some embodiments of the present invention.
Figure 21:
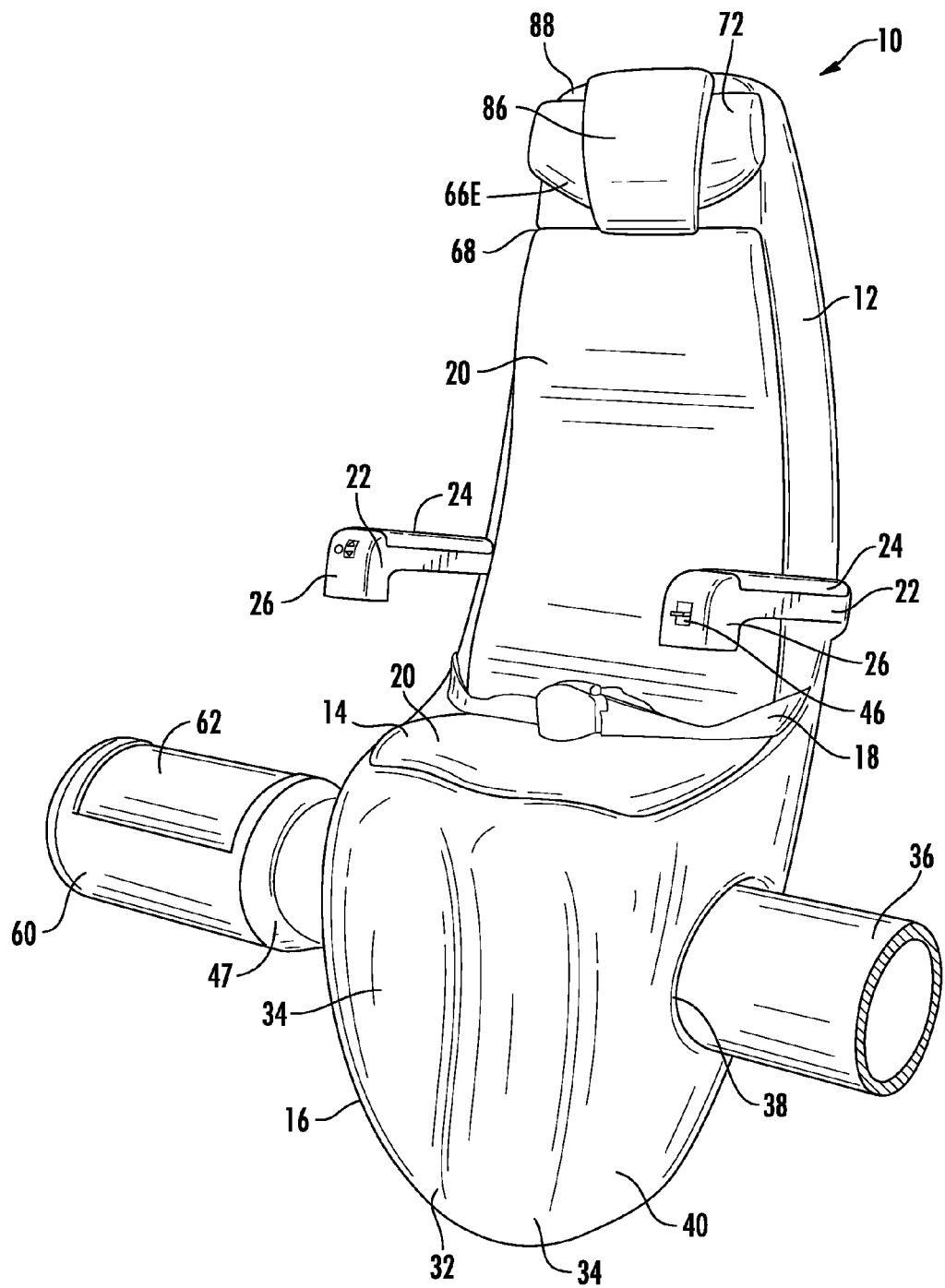
FIG. 21 is a front perspective view of a passenger seat assembly according to some embodiments of the present invention.

In certain other embodiments, as shown in FIGS. 20-21, a headrest 66E may be coupled to the seat back support 12. In these embodiments, the headrest 66E has a curved rear surface 80 that includes a horizontal track 82. In some embodiments, a portion of a structure 86 may be inserted within the horizontal track 82 so that the headrest 66E is rotatably coupled to the structure 86.

In these embodiments, the headrest 66E may horizontally rotate along the horizontal track 82 relative to the structure 86 so that a passenger may adjust the amount of support available on either side of the passenger's head by rotating the headrest 66E to the side of the passenger's head where additional support is desired.

The structure 86 may be pivotally coupled to at least one vertical track 84 in a manner that allows the headrest 66E to pivot from an upright position to a reclined position relative to the upper edge 68 of the seat back support 12.

In some embodiments, the structure 86 may be mounted to the vertical track 84 in a fixed vertical location. Thus, the vertical track 84/structure 86 coupling may be configured to maintain the headrest 66E in a stationary vertical position relative to the upper edge 68.

In other embodiments, as shown in FIG. 20, the vertical track 84/structure 86 coupling may be configured to allow the headrest 66E to vertically translate relative to the upper edge 68. For example, the vertical track 84 may form an end of the extension column 78 (as more clearly shown in FIGS. 17-19). Thus, the extension column 78 may be raised or lowered as needed to adjust the vertical position of the headrest 66E. In certain other embodiments, the structure 86 may be coupled to the vertical track 84 in a manner that allows the structure 86 to travel along the vertical track 84 as needed to adjust the vertical position of the headrest 66E.

Thus, the headrest 66E may have at least three different adjustment options in certain embodiments: side to side rotation, vertical movement, and reclined/upright pivot.

In certain other embodiments, as illustrated in FIG. 21, a headrest support structure 88 may be positioned aft of the vertical track 84, the structure 86, and the headrest 66E. In these embodiments, the headrest support structure 88 may be shaped to have a width that corresponds to the width of the seat back support 12 and a height that corresponds to the height of the headrest 66E. In certain embodiments, as shown in FIG. 21, the headrest support structure 88 may be fixedly coupled to the seat back support 12 adjacent the upper edge 68. In other embodiments, the headrest support structure 88 may be integrally formed with the seat back support 12 so that the headrest support structure 88 remains at a fixed position relative to the seat back support 12. In yet other embodiments, the headrest support structure 88 may be pivotally coupled to the upper edge 68.

Figure 22:
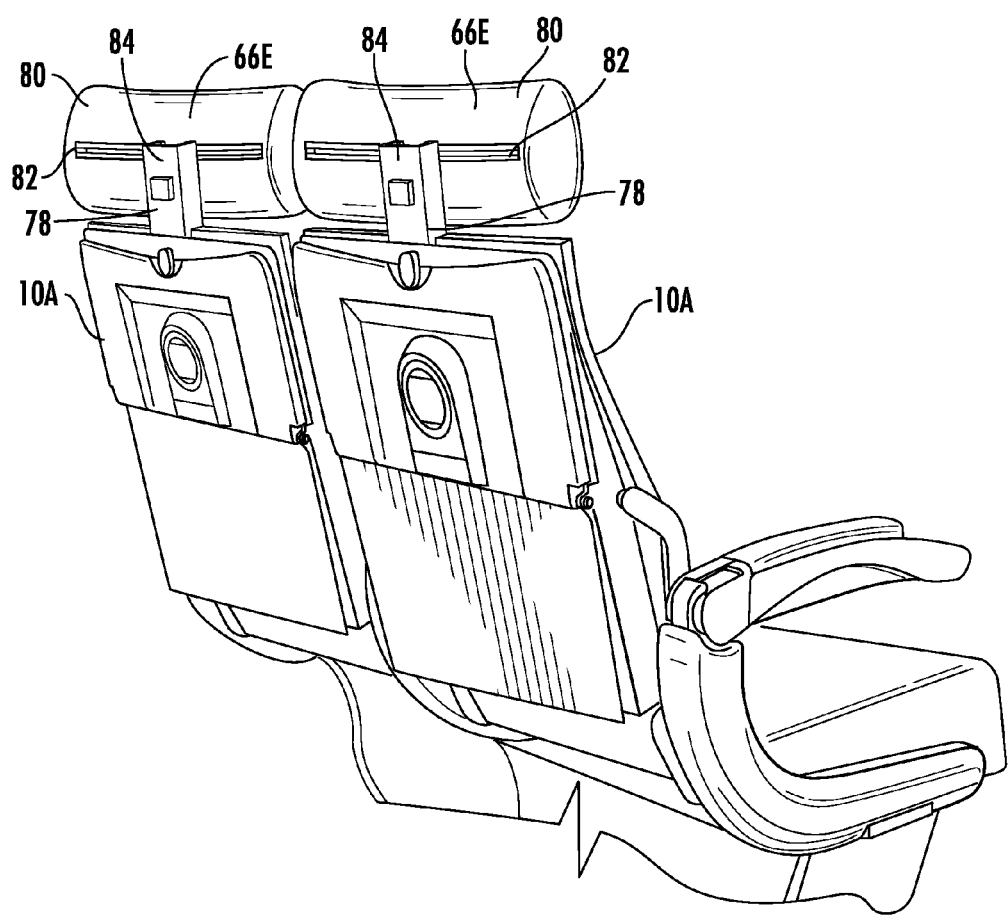
FIG. 22 is a rear perspective view of a plurality of passenger seat assemblies according to some embodiments of the present invention.

In certain embodiments, as shown in FIG. 21, the structure 86 may be configured to overlap at least a portion of the headrest 66E so that the headrest 66E is configured to horizontally travel through a channel within the structure 86. The structure 86 may be positioned adjacent the center of the headrest support structure 88 and configured to support a passenger's head. Thus, in these embodiments, the headrest 66E may be horizontally adjusted by the passenger without disturbing the passenger's head that may be resting on the structure 86. As illustrated in FIG. 22, the headrest 66E may be coupled to any suitable type of passenger seat assembly 10A.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat assembly comprising:
   (a) a seat back support;
   (b) a seat pan coupled to the seat back support;
   (c) a seat support structure coupled to the seat pan, wherein the seat support structure comprises a mounting channel; and
   (d) a mounting bar inserted through the mounting channel and coupled to the seat support structure, wherein the mounting bar is configured to pivotally couple to a side structure of a passenger cabin and to extend laterally therefrom.

2. The passenger seat assembly of claim 1, wherein the seat back support, the seat pan, and the seat support structure are integrally molded as a single piece.

3. The passenger seat assembly of claim 1, wherein the mounting bar is configured to rotate the passenger seat assembly between an upright position and a reclined position.

4. The passenger seat assembly of claim 1, wherein the seat support structure comprises niches that are configured to substantially conform to at least a portion of a passenger's legs.

5. The passenger seat assembly of claim 1, further comprising at least one compartment coupled to at least one end of the mounting bar.

6. The passenger seat assembly of claim 1, further comprising:
   (e) a headrest comprising a horizontal track positioned in a curved rear surface of the headrest;
   (f) a vertical track coupled to the seat back support; and
   (g) a structure coupled to the horizontal track and the vertical track;
   wherein the headrest is configured to horizontally rotate relative to the structure, and the structure is configured to vertically travel along the vertical track.

7. A passenger seat assembly comprising:
(a) a plurality of seat support structures, wherein each seat support structure comprises a mounting channel; and
(b) a mounting bar comprising a plurality of sections, wherein each section is inserted through the mounting channel and coupled to one of the plurality of seat support structures, wherein each of the plurality of sections is configured to rotate independently of the other sections, wherein the mounting bar is configured to pivotally couple to a side structure of a passenger cabin and to extend laterally therefrom.

8. The passenger seat assembly of claim 7, further comprising
(c) a plurality of seat back supports; and
(d) a plurality of seat pans;
wherein each of the plurality of seat pans is coupled to one of the plurality of seat back supports and one of the plurality of seat support structures.

9. The passenger seat assembly of claim 7, wherein each of the plurality of sections is configured to rotate one of the plurality of seat support structures between an upright position and a reclined position.

10. The passenger seat assembly of claim 7, wherein each of the plurality of seat support structures comprises niches that are configured to substantially conform to at least a portion of a passenger's legs.

11. The passenger seat assembly of claim 7, further comprising at least one compartment coupled to at least one end of the mounting bar.

* * * * *